J. B. KINGAN & H. F. RIPKEN.
DEVICE FOR VALVE GEAR.
APPLICATION FILED DEC. 20, 1915.
Reissued Apr. 1, 1919. 14,624.
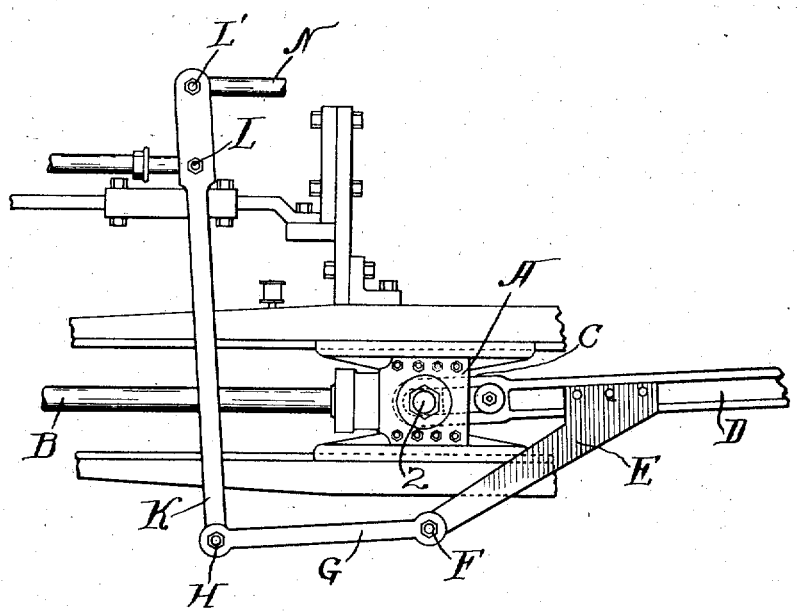
Inventors:
James B. Kingan
Hugo F. Ripken
by: Lothrop & Johnson
Att'ys.
THE NORRIS PETERS CO., PHOTO-LITHO., WASHINGTON, D. C.

UNITED STATES PATENT OFFICE.

JAMES B. KINGAN AND HUGO F. RIPKEN, OF MINNEAPOLIS, MINNESOTA.

DEVICE FOR VALVE-GEAR.

14,624. Specification of Reissued Letters Patent. Reissued Apr. 1, 1919.

Original No. 1,023,520, dated April 16, 1912, Serial No. 658,258, filed November 2, 1911. Application for reissue filed December 20, 1915. Serial No. 67,934.

*To all whom it may concern:*

Be it known that we, JAMES B. KINGAN and HUGO F. RIPKEN, citizens of the United States, residing at Minneapolis, in the county of Hennepin and State of Minnesota, have invented certain new and useful Improvements in Devices for Valve-Gear, of which the following is a specification.

The invention relates to new and useful improvements in valve gear, driven apparatus for locomotive engines, etc., its object being to provide a simple and practical device designed particularly to overcome the slow action that the combination lever imparts to the Walschaert and similar valve gears.

To this end, the invention consists in the features of construction and arrangement of parts hereinafter described as follows:

In the accompanying drawing forming part of this specification,

The figure is a view of the valve actuating mechanism.

Reference now being had to the drawing by letter, A designates the usual cross head and B the piston rod extending from one side thereof and rigidly connected thereto. D represents the pitman having pivotal support C in the cross head as by means of a pin 2 projecting from the side opposite the piston rod. An arm E is fastened to the pitman and projects downwardly and forwardly therefrom so that at its lower end it stands below the cross-head. The arm E at it slower end is connected by pivot F to a link G, said link at its opposite or forward end being pivotally connected at H with an upwardly extending lever K. The lever K is fulcrumed upon the pivot L and at its upper end is pivotally connected by a pivot L′ with a radius bar N, which controls the valves of the steam chest, not shown.

As pointed out, this device is designed to overcome the slow action that the combination lever used in connection with the well-known Walschaert gear imparts to said gear and similar valve gears. In the use of such gears as the Walschaert, there is a slow starting of trains and maintenance of speed by the engines, due to the heavy constant lead required at short cut-offs in order to maintain sufficient port opening where little opening other than that transmitted by the combination lever is given to the valve.

This constant lead is too excessive for the maximum cut-off and the starting of a train, and as it requires one-half the movement of the cross-head in such gears to overcome lap and lead, there is a tendency to slow the action of the valve gear, as ordinarily connected.

In our construction in addition to the usual cross-head motion, there is the supplementary motion received from the pitman, as there is utilized the oscillatory movement of the pitman which the pitman receives from its pivot the wrist pin. The fact that the largest part of this movement is transmitted to the combination lever as the cross-head approaches and recedes from the end of its travel, causes the combination lever to be given a different movement from that permitted by the usual cross-head connection, and to be given a movement which prevents the slowing up of the action of the valve gear as ordinarily connected.

When the pitman is in the center of its oscillatory movement derived from the wrist pin, no movement is transmitted to the combination lever other than that given by the cross-head and that the combination lever therefore stands in the same position as if directly connected to the cross-head. Lead is therefore not affected in this position.

In the drawing where the cross-head is shown approaching the forward center and the pitman is in an upwardly inclined position, the bottom end of the combination or link connection is pulled back the same degree that the pitman is upwardly inclined. The events of release, compression and pre-admission taking place in this part of the stroke are delayed proportionately with the delayed action of the combination lever.

When the cross-head has started on its return stroke and the pitman is in a downwardly inclined position, it will be evident that the return movement of the lower end of the combination lever has been delayed by the downward inclination of the pitman. This delay of the return movement of the combination lever gives to the valve a quicker, larger and longer maintained port opening with the same cut-off, and a longer cut-off with the reverse lever in the same position than the Walschaert or other similar valve gears can give using the old style cross-head connection.

To sum up, later release and compression, less pre-admission, a quicker, larger and longer maintained port opening with the same cut-off allow the use of a shorter cut-off with its subsequent saving of the steam, and this fact combined with the longer maximum cut-off obtainable makes it absolutely certain that a quicker starting, faster, more powerful and a more economical engine is obtained.

This movement, as is shown in the diagrams, causes (as the piston is on the last half of its stroke), release compression and pre-admission to occur later in the stroke with the same cut-off, thereby giving a longer period of expansion, less compression, and through the fact that the supplementary motion transmitted is the greatest just as the cross-head approaches and recedes from the end of its travel, there is a great deal less pre-admission with the same amount of lead.

As the piston reaches the end of its travel, the pitman being now in the center of its oscillatory movement, the device has no effect upon the lead. But as the piston leaves the end of its travel and the pitman again assumes an angle, a quicker, larger and longer maintained port opening is obtained with the same cut-off.

We claim:

A valve gear regulating apparatus for locomotives, etc., comprising in combination with a cross head, a frame in which the same reciprocates, a piston rod projecting from one side of the cross head and rigidly connected thereto, a pitman projecting from the other side of the cross head and pivotally supported therein, an arm fastened to the pitman and projecting downwardly and forwardly below the cross head, a lever, a radius rod with which one end of said lever is connected, a pivotal link connection between the opposite end of said lever and said arm, and a rod pivotally connected with said lever intermediate of its ends.

In testimony whereof, we have hereunto set our hands this 6th day of December, 1915.

JAMES B. KINGAN.
HUGO F. RIPKEN.

Witnesses:
H. S. JOHNSON,
H. SWANSON.

Copies of this patent may be obtained for five cents each, by addressing the "Commissioner of Patents, Washington, D. C."